United States Patent
Saarisalo et al.

(10) Patent No.: US 8,081,060 B1
(45) Date of Patent: Dec. 20, 2011

(54) SYSTEM AND METHOD FOR COMMUNICATIONS ESTABLISHMENT

(75) Inventors: Mikko Saarisalo, Kantvik (FI); Jussi Lahdenniemi, Julkujarvi (FI)

(73) Assignee: Nokia Corporation, Espoo (FI)

( * ) Notice: Subject to any disclaimer, the term of this patent is extended or adjusted under 35 U.S.C. 154(b) by 1373 days.

(21) Appl. No.: 11/382,973

(22) Filed: May 12, 2006

(51) Int. Cl.
*H04Q 5/22* (2006.01)
(52) U.S. Cl. .......... 340/10.1; 340/12.5; 340/539.11; 455/41.2; 455/41.1
(58) Field of Classification Search .......... 340/10.1, 340/12.5, 5.65, 539.11, 505; 455/41.2, 41.1
See application file for complete search history.

(56) References Cited

U.S. PATENT DOCUMENTS

| | | | |
|---|---|---|---|
| 6,173,899 B1 * | 1/2001 | Rozin | 235/492 |
| 6,703,935 B1 * | 3/2004 | Chung et al. | 340/572.7 |
| 6,776,339 B2 | 8/2004 | Piikivi | |
| 7,232,069 B1 * | 6/2007 | White | 235/451 |
| 7,519,325 B2 * | 4/2009 | Wakim | 455/41.2 |

FOREIGN PATENT DOCUMENTS

| | | |
|---|---|---|
| WO | WO2005008575 A1 | 1/2005 |
| WO | WO2005045744 A1 | 5/2005 |
| WO | WO2005093643 A1 | 10/2005 |
| WO | WO2006010943 A1 | 2/2006 |

* cited by examiner

*Primary Examiner* — Vernal Brown
(74) *Attorney, Agent, or Firm* — Locke Lord LLP (57) ABSTRACT

Systems and methods applicable, for instance, in communications establishment. A wireless node and/or other computer might, for example, perform one or more operations to provide for connection by external devices seeking to access the wireless node and/or other computer. The wireless node and/or other computer might, for instance, expose various communications.

32 Claims, 6 Drawing Sheets

SYSTEM AND METHOD FOR COMMUNICATIONS ESTABLISHMENT

FIELD OF INVENTION

This invention relates to systems and methods for communications establishment.

BACKGROUND INFORMATION

In recent times, there has been an increase in connection with wireless nodes and/or other computers. For example, many users have increasingly come to allow connection with their wireless nodes and/or other computers for purposes such as, for instance, peer-to-peer operation, data access, ticket functionality, and making purchases.

Accordingly, there may be interest in technologies that facilitate such use of wireless nodes and/or other computers.

SUMMARY OF THE INVENTION

According to embodiments of the present invention, there are provided systems and methods applicable, for instance, in communications establishment.

A wireless node and/or other computer might, in various embodiments, perform one or more operations to provide for connection by external devices seeking to access the wireless node and/or other computer.

The wireless node and/or other computer might, in various embodiments, expose various communications.

DETAILED DESCRIPTION OF THE INVENTION

General Operation

According to embodiments of the present invention, there are provided systems and methods applicable, for instance, in communications establishment.

A wireless node and/or other computer might, in various embodiments, perform one or more operations to provide for connection by external devices seeking to access the wireless node and/or other computer in various ways (e.g., via Near Field Communications (NFC) and/or in the manner that a contactless smartcard would be accessed).

The wireless node and/or other computer might, in various embodiments, expose various communications. Such exposing of communications might, in various embodiments, take into account various factors.

Various aspects of the present invention will now be discussed in greater detail.

Wireless Node and/or Other Computer Operations

According to various embodiments of the present invention, a wireless node and/or other computer might provide for connection by external devices seeking to access the wireless node and/or other computer in different ways.

For instance, the wireless node and/or other computer might provide for connection by external devices seeking to access the wireless node and/or other computer via near field communications (NFC), and/or might provide for connection by external devices seeking to access the wireless node and/or other computer in the manner that a contactless smartcard would be accessed (e.g., for transaction operations). In various embodiments, such operation by the wireless node and/or other computer might be implemented in a manner seeking to provide to such external devices fast and/or optimized connection, and/or might be implemented in a manner seeking to provide power savings for the wireless node and/or other computer, and/or for such external devices.

External devices seeking to access the wireless node and/or other computer via NFC might, in various embodiments, be seeking to access the wireless node and/or other computer as if it were a Radio Frequency Identification (RFID) tag, and/or be seeking to access the wireless node and/or other computer for peer-to-peer operation.

The wireless node and/or other computer might, in various embodiments, have access to communications hardware (e.g., NFC hardware) and/or one or more smartcards. Such communications hardware and/or smartcards might, for instance, be internal and/or external to the wireless node and/or other computer.

Such NFC hardware might, in various embodiments, be employable in a number of ways. For example, the wireless node and/or other computer might be able to employ the NFC hardware in acting as an RFID reader and/or writer, in initiating NFC communications (e.g., in initiating peer-to-peer NFC communications with another wireless node and/or other computer), in exposing NFC communications to external devices (e.g., for peer-to-peer operation and/or operation in the manner of an RFID tag), and/or in exposing contactless smartcard communications. Such acting as an RFID reader and/or writer might, in various embodiments, involve sending of interrogations.

Such peer-to-peer operation via NFC communications exposure might, in various embodiments, involve the wireless node and/or other computer operating, at least initially, in a passive mode. Such operation in the manner of an RFID tag via NFC communications exposure might, in various embodiments, involve external devices being able to read data from NFC hardware accessible by the wireless node and/or other computer. Such exposing of contactless smartcard communications might, in various embodiments, allow for external devices to establish transaction operations with one or more smartcards. It is noted that, in various embodiments, such exposure of NFC communications and/or exposure of contactless smartcard communications might involve the wireless node and/or other computer operating between attempts to initiate NFC communications (e.g., between interrogation dispatches) and/or operating in a mode where no attempt to initiate NFC communications is made (e.g., in a passive mode and/or where no interrogations are sent).

It is noted that, in various embodiments, initiation of NFC communications might involve the sending of one or more interrogations via the NFC hardware. It is further noted that, in various embodiments, exposing of NFC communications and/or contactless smartcard communications might be viewed as operation in one or more modes, presentation of one or more targets (e.g., one or more Ecma International ECMA 340 targets), and/or presentation of one or more Proximity Integrated Circuit Cards (PICCs) (e.g., one or more International Organization for Standardization (ISO) 14443 PICCs). Exposing of NFC communications might, in various embodiments, be viewed as a tag emulation mode (e.g., an RFID tag emulation mode).

The wireless node and/or other computer might, in various embodiments, be able to determine how far an external device proceeds in establishing communications with the wireless node and/or other computer via NFC and/or in the manner that a contactless smartcard would be accessed, and/or might be able to continue a current exposing (e.g., of the sort discussed above), switch to a different exposing (e.g., of the sort discussed above), and/or repeat one or more detections (e.g., of communication establishment by the external device). As an illustrative example, such exposure switching might involve ceasing exposure of NFC communications and starting exposure of contactless smartcard communications.

The wireless node and/or other computer might, in various embodiments, have the ability to provide and/or deny power to a smartcard. As another example, the wireless node and/or other computer might have the ability to set preference settings within a smartcard (e.g., to send preference settings to software running on the smartcard). As yet another example, the wireless node and/or other computer might have the ability to establish communications between a smartcard and communications hardware (e.g., NFC hardware). Such communications establishment might, for instance, involve the wireless node and/or other computer establishing a connection between communications hardware and one or more communication ports of a smartcard.

It is noted that, in various embodiments, establishing communications between a smartcard and communications hardware might involve the disruption of some or all communications between the smartcard and one or more processors of the wireless node and/or other computer (e.g., communications between the one or more processors and the smartcard via one or more communication ports of the smartcard). Such communications disruption might, for example, involve the wireless node and/or other computer not having control over and/or not being aware of that which is communicated by the smartcard via the communications hardware. It is further noted that, in various embodiments, NFC communications might be exposed in such a manner that the wireless node and/or other computer denies one or more smartcards access to NFC communications hardware.

It is noted that, in various embodiments, establishing communications between the smartcard and communications hardware might allow for communications between the smartcard and one or more processors of the wireless node and/or other computer (e.g., communications between the one or more processors and the smartcard via one or more communication ports of the smartcard). For example, in various embodiments certain information might be exchanged between the smartcard and the one or more processors (e.g., one or more indications might be passed between the smartcard and the one or more processors). Such functionality might, for instance, be employed in embodiments where an external device seeking to access the wireless node and/or other computer in the manner that a contactless smartcard would be accessed keeps one or more radio frequency fields active throughout communication operations.

Figure 1:
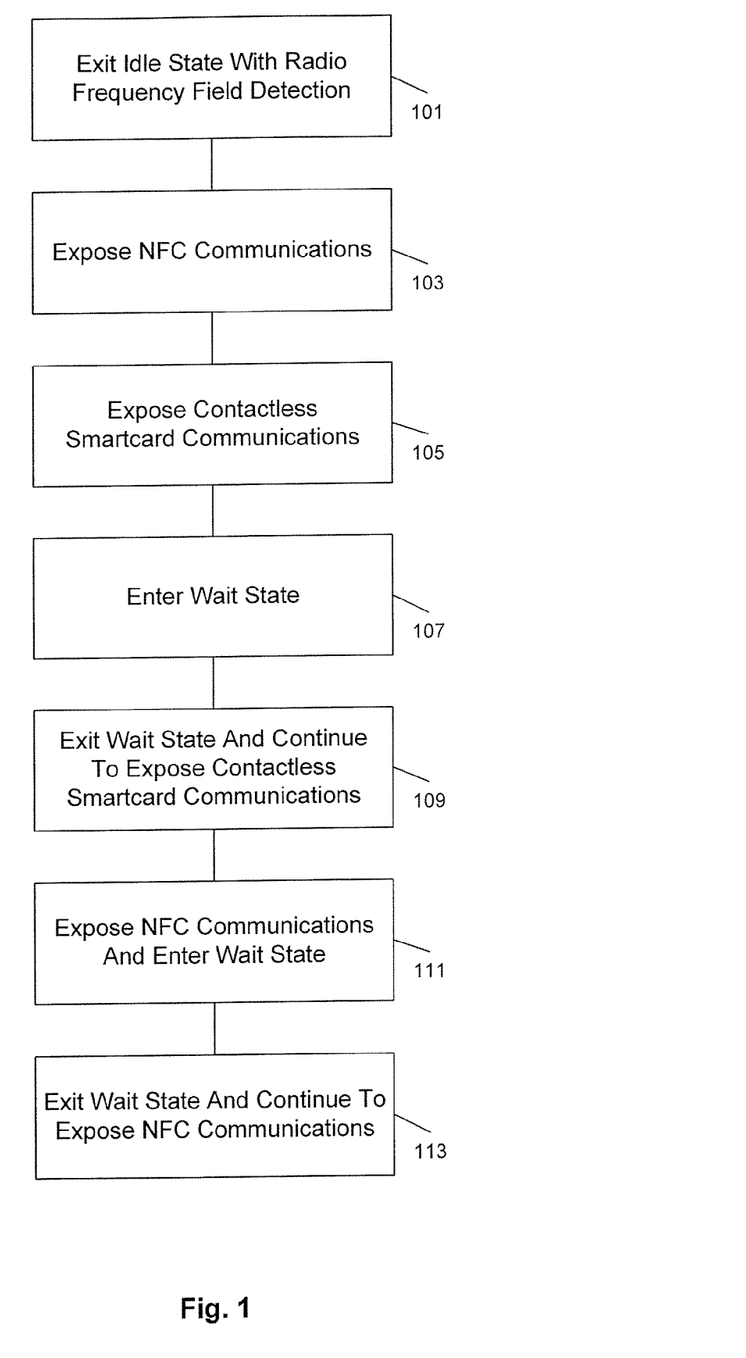
FIG. 1 shows exemplary steps involved in wireless node and/or other computer operations according to various embodiments of the present invention.

With respect to FIG. 1 it is noted that, in various embodiments, the wireless node and/or other computer might, in acting to provide for connection by external devices seeking to access the wireless node and/or other computer via NFC and to provide for connection by external devices seeking to access the wireless node and/or other computer in the manner that a contactless smartcard would be accessed, exit an idle state with detection of a radio frequency field emitted by an external device (e.g., a field from a periodic series of fields) (step 101). The wireless node and/or other computer might then expose NFC communications to external devices (step 103). The wireless node and/or other computer might, for instance, perform such exposure for a particular period of time. Such period of time might, for instance, be set by a manufacturer and/or system administrator. The wireless node and/or other computer might, in various embodiments, perform NFC exposure during a time that the detected field was active. The wireless node and/or other computer might, in various embodiments, cease NFC exposure and return to the idle state in the case where the field ends (e.g., in the case where the field ends prematurely and/or unexpectedly).

The wireless node and/or other computer might, in performing NFC exposure, determine if an external device established communication via the exposed NFC communications. Where such was found to be the case the wireless node and/or other computer might, for instance, allow such established communication to its course. The wireless node and/or other computer might, for example, return to the idle state after such established communications had terminated. It is noted that, in various embodiments, such determination as to whether or not an external device established communication via the exposed NFC communications might be performed by the wireless node and/or other computer a set number of times (e.g., one time). Such a number of times might, for instance, be set by a manufacturer and/or system administrator. The time required to perform such determination might, in various embodiments, be known or approximately known. As an illustrative example, such a time might be approximately 100 ms.

In the case where no external device established such communication, the wireless node and/or other computer might, in various embodiments, cease NFC exposure and expose contactless smartcard communications to external devices (step 105). The wireless node and/or other computer might, in various embodiments, perform contactless smartcard communications exposure during a time that the detected field was active. It is noted that, in various embodiments, the functionality by which the wireless node and/or other computer initially performs NFC exposure rather than contactless smartcard communications exposure subsequent to detecting a radio frequency field and exiting the idle state might be implemented in view of communications between one or more processors of the wireless node and/or other computer and a smartcard being disrupted with contactless smartcard communications exposure as discussed above.

With determination of cessation of the detected field the wireless node and/or other computer might, for instance, enter a wait state (step 107). In the wait state the wireless node and/or other computer might, for example, wait for a period of time for another emitted radio frequency field (e.g., another field from the periodic series of fields). Such a period of time (e.g., two seconds) might, for instance, be set by a manufacturer and/or system administrator. In the case where no such field was detected by the wireless node and/or other computer, the wireless node and/or other computer might, for example, return to the idle state. In various embodiments, the wireless node and/or other computer might continue to expose the contactless smartcard communications during the wait state.

It is noted that, in various embodiments, the wireless node and/or other computer might alternately or additionally return to the idle state in the case where there was request that the wireless node and/or other computer initiate communications (e.g., NFC communications). In response to such a request, the wireless node and/or other computer might, in various embodiments, cease contactless smartcard communications exposure, initiate near field communications, and then return to the idle state once initiated communications had run their course. Such a request might, for example, be provided by a user of the wireless node and/or other computer, and/or by software running remote from and/or at the wireless node and/or other computer.

Having detected another emitted radio frequency field (e.g., another field from the periodic series of fields), the wireless node and/or other computer might, for instance, exit the wait state and continue to expose the contactless smartcard communications (step 109). Such detection might, for instance, be within the period of time and/or with there being no communications initiation request. The wireless node and/or other computer might, in various embodiments, so continue to expose the contactless smartcard communications during a time that the radio frequency field was active.

With determination of cessation of the radio frequency field the wireless node and/or other computer might, in various embodiments, cease contactless smartcard communications exposure, again expose the NFC communications, and enter a wait state (step 111). It is noted that, in various embodiments, the wait state might alternately or additionally be entered in the case where there was request that the wireless node and/or other computer initiate communications (e.g., NFC communications). Such a request might, for instance, be provided in a manner analogous to that discussed above (e.g., via a user and/or software). Such a request might, for instance, be received during the above-discussed exposure of contactless smartcard communications subsequent to NFC exposure following exiting the idle state, and prior to field cessation (e.g., during step 105). In various embodiments, receiving such a request the wireless node and/or other computer might cease contactless smartcard communications exposure, initiate near field communications, and then enter the wait state once initiated communications had run their course.

In the wait state, the wireless node and/or other computer might, for instance, expose the NFC communications and wait for a period of time for yet another emitted radio frequency field (e.g., another field from the periodic series of fields). Such a period of time (e.g., two seconds) might, for instance, be set in a manner analogous to that discussed above. In the case where no such field was detected, the wireless node and/or other computer might, for instance, return to the idle state. In the case where such a field was detected, the wireless node and/or other computer might, for instance, exit the wait state and continue to expose the NFC communications (step 113). The wireless node and/or other computer might, in various embodiments, so continue to expose the NFC communications during a time that the radio frequency field was active.

In such continuation of exposure of the NFC communications the wireless node and/or other computer might, for instance, in the case where no external device established communication via the exposed NFC communications, keep exposing NFC communications until radio frequency field cessation, and then return to the idle state. In the case where an external device had established communication, the wireless node and/or other computer might, for instance, allow such established communication to run its course before returning to the idle state.

It is noted that, in various embodiments, in the case where cessation of the field did not occur within a particular period of time, the wireless node and/or other computer might cease NFC exposure and expose the contactless smartcard communications during a time that the radio frequency field was active. Such a period of time (e.g., two seconds) might, for example, be set in a manner analogous to that discussed above.

Such functionality might be implemented in a number of ways. For instance, in various embodiments the wireless node and/or other computer might jump from step 113 to step 105.

It is noted that, in various embodiments, radio frequency fields might be other than those from one or more periodic series of fields. For example, an external device (e.g., an RFID reader) might keep one or more radio frequency fields active throughout operations discussed herein. Accordingly, in various embodiments, various operations discussed herein (e.g., those discussed with respect to FIG. 1) might be performed with respect to such fields.

It is also noted that, in various embodiments, radio frequency fields discussed herein might be those suitable for NFC communications (e.g., 13.56 MHz fields with suitable modulation). Moreover, in various embodiments, various hardware, devices, and/or operations discussed herein might not be affected by and/or might not react to unsuitable fields.

It is further noted that, in various embodiments, establishment of NFC communications between the wireless node and/or other computer and an external device might involve device discovery procedures, anti-collision procedures, protocol activation, and/or NFC communications commencement. For example, device discovery and/or anti-collision procedures might be performed, followed by protocol activation, followed by NFC communications commencement. NFC communications commencement might, in various embodiments, only be performed in the case where device discovery procedures, anti-collision procedures, and/or protocol activation were successfully completed.

Device discovery and/or anti-collision procedures might, for instance, involve the wireless node and/or other computer providing its NFC Unique Identifier (UID) to the external device for performance of device detection and/or anti-collision procedures. Protocol activation might, for instance, involve the wireless node and/or other computer indicating to the external device one or more protocol capabilities and/or one or more protocols to be used (e.g., Near Field Communication Interface and Protocol (NFCIP-1) might be indicated).

It is additionally noted that, in various embodiments, an external device accessing the wireless node and/or other computer in the manner that a contactless smartcard would be accessed (e.g., for transaction operations) might involve device discovery procedures, anti-collision procedures, protocol activation, and/or communications commencement. Communications commencement might, in various embodiments, only be performed in the case where device discovery procedures, anti-collision procedures, and/or protocol activation were successfully completed.

Device discovery and/or anti-collision procedures might, for instance, involve one or more smartcards to which the wireless node and/or other computer has access providing one or more UIDs to the external device for performance of device detection and/or anti-collision procedures. Such UIDs might, for example, be smartcard UIDs and/or UIDs indicating various capabilities discussed herein (e.g., various capabilities discussed herein with respect to FIG. 1). Protocol activation might, for instance, involve the one or more smartcards indicating to the external device one or more protocol capabilities and/or one or more protocols to be used (e.g., ISO 14443-4 and/or Mifare 1k might be indicated).

Figure 2:
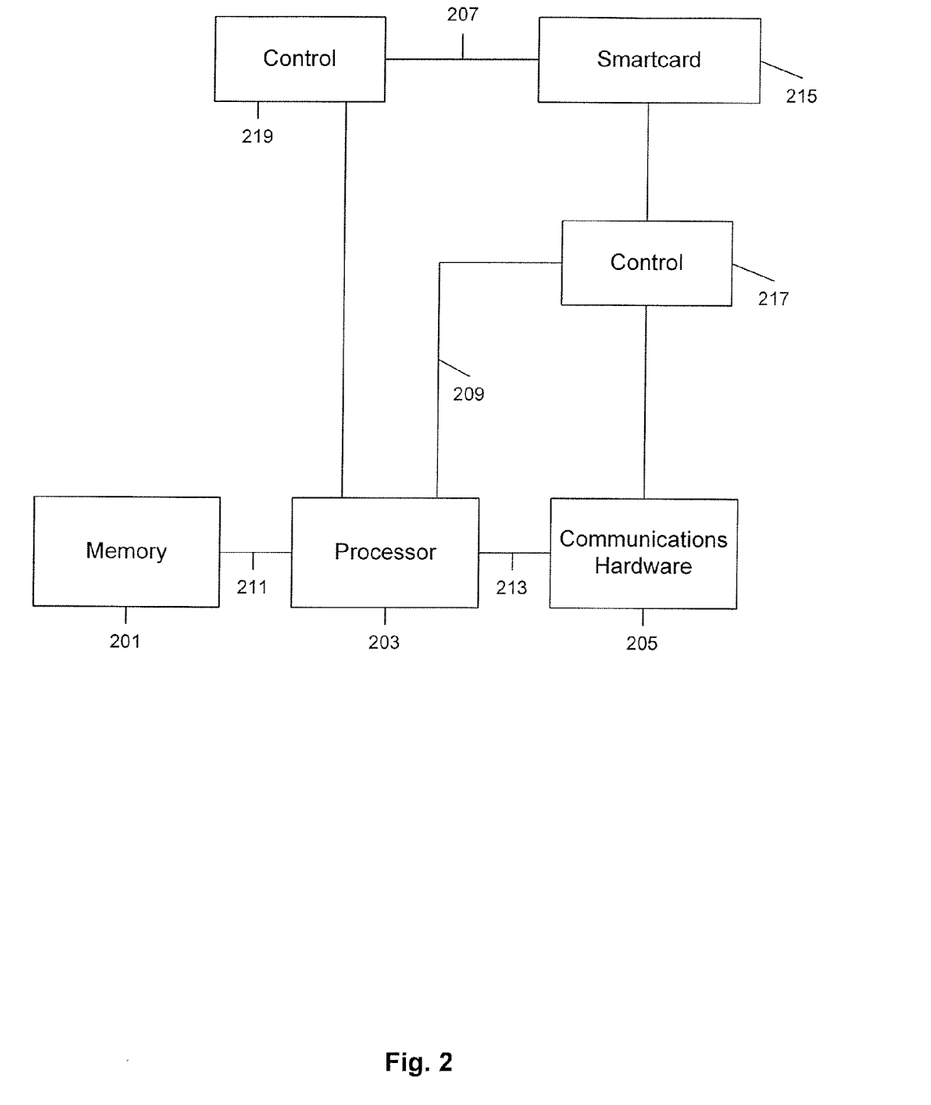
FIG. 2 shows exemplary aspects of a wireless node and/or other computer according to various embodiments of the present invention.

Shown in FIG. 2 are exemplary aspects of a wireless node and/or other computer according to various embodiments of the present invention. That which is depicted in FIG. 2 includes, for instance, memory 201 (e.g., including application storage), processor 203, communications hardware 205 (e.g., NFC communications hardware), power connection 207, interconnect 209, interconnect 211, interconnect 213, smartcard 215, control 217, and control 219.

Control 219 might, for instance, be employed in providing and/or denying power to smartcard 215. Control 217 might, for instance, be employed in establishing communications between smartcard 215 and communications hardware 205. Such establishment might, in various embodiments, involve disruption of some or all communications between smartcard 215 and processor 203. Processor 203 might, in various embodiments be a microcontroller. It is noted that, in various embodiments, processor 203 might be a non-microcontroller processor.

Interconnects 209-213 might be implemented in a number of ways. For instance, Inter-Integrated Circuit (I2C), Peripheral Component Interconnect (PCI), Mini Peripheral Component Interconnect (Mini PCI), Peripheral Component Interconnect Express (PCIe), Mini Peripheral Component Interconnect Express (Mini PCIe), and/or HyperTransport might, in various embodiments, be employed in implementation of one or more of interconnect 209, interconnect 211, and interconnect 213. Control 217 and control 219 might be implemented in a number of ways. For instance, implementation of control might involve hardware and/or software. It is noted that, in various embodiments, implementation of control 217 and/or control 219 might involve one or more hardware and/or software switches.

It is noted that, in various embodiments, various functionality discussed herein might be provided via a shell and/or cover that is attached to and/or communicates with a wireless node and/or other computer. Such communication might, for instance, be wired (e.g., via Universal Serial Bus (USB)) and/or be wireless (e.g., via Ultra Wide Band (UWB), Bluetooth, and/or Infrared Data Association (IrDA)). Such a shell and/or cover might, for instance, provide communications hardware (e.g., NFC communications hardware), one or more smartcards, one or more interconnects, and/or one or more controls.

Functionality whereby a wireless node and/or other computer can provide for connection by external devices seeking to access the wireless node and/or other computer via NFC (e.g., for peer-to-peer operations, and/or as if the wireless node and/or other computer were an RFID tag), and/or connection by external devices seeking to access the wireless node and/or other computer in the manner that a contactless smartcard would be accessed might be employed in a number of ways. For instance, such functionality might be employed in sharing data among wireless node and/or other computers (e.g., via NFC communications exposure), allowing for purchasing using the wireless node and/or other computer (e.g., via contactless smartcard communications exposure), and/or allowing for the wireless node and/or other computer to act as a ticket (e.g., via NFC communications exposure). Such ticket functionality might, for example, involve the wireless node and/or other computer being accessed as if it were an RFID tag. Such a ticket might, for instance, be a ski lift ticket, a ticket for using a parking lot, a theater ticket, and/or a ticket for attending a sporting event.

External Device Near Field Communications Access Operations

Figure 3:
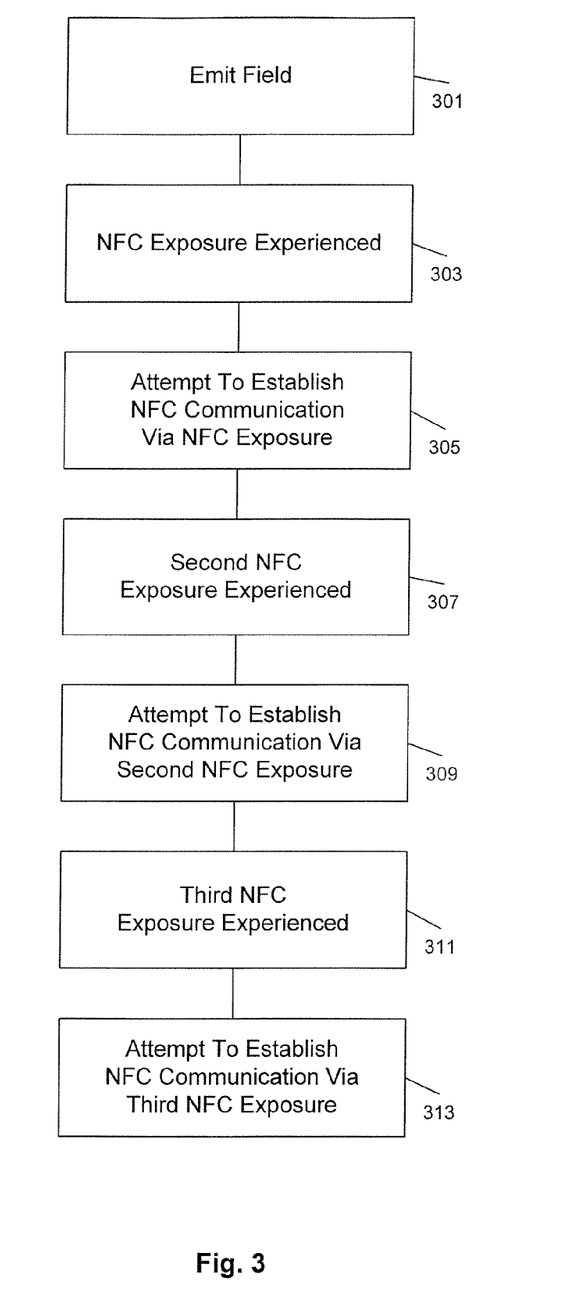
FIG. 3 shows exemplary steps involved in external device near field communications access operations according to various embodiments of the present invention.

With respect to FIG. 3 it is noted that a device seeking to access a wireless node and/or other computer of the sort discussed herein by establishing NFC communication with it might, in various embodiments, emit a radio frequency field (step 301). As discussed above, in various embodiments a wireless node and/or other computer detecting a radio frequency field emitted by an external device might exit an idle state and expose NFC communications. Accordingly, with emission of the radio frequency field the device might, in various embodiments, experience such NFC exposure by the wireless node and/or other computer with which it is seeking to establish NFC communication (step 303).

The device might, for instance, then attempt to establish NFC communication with the wireless node and/or other computer via the NFC exposure (step 305). In the case where this is successful, the wireless node and/or other computer might, for example, allow the established communication to run its course (e.g., as discussed above). In the case where the device is not successful in establishing NFC communication with the wireless node and/or other computer, the device might not experience a second NFC exposure by the wireless node and/or other computer until it had performed radio frequency field emission (e.g., with corresponding field cessations) a certain number of times. Such field emissions might, in various embodiments, be members of a periodic series of fields of which the emitted field that resulted in NFC exposure was also a member.

The device might, in various embodiments, cease field exposure, emit a second field, cease that second field, emit a third field, and then again experience the second NFC exposure by the wireless node and/or other computer (step 307), with all fields perhaps being members of a periodic series of fields. The time during which the device was not experiencing NFC exposure might, in various embodiments, correspond to a time during which the wireless node and/or other computer exposed contactless smartcard communications as discussed above (e.g., during performance of steps 105-109).

The device, so experiencing the second NFC exposure (e.g., via the wireless node and/or other computer's performance of step 113), might, via the second NFC exposure, again attempt to establish NFC communication with the device (step 309). Where establishment was not successful, the device might, in various embodiments, experience a third NFC exposure (step 311) subsequent to performing a field cessation and a field emission (e.g., as part of emitting a periodic series of fields). Such a third NFC exposure might, for instance, occur during the wireless node and/or other computer performing step 103 subsequent to performing step 113, entering the idle state with field cession, and performing step 101. The device might then, for instance, try establishment again via this third NFC exposure (step 313).

It is noted that, in various embodiments, the worst case delay experienced by the device in establishing NFC communications with the wireless node and/or other computer might be the time for it to perform three field exposures with corresponding field cessations (e.g., emitting the fields as members of a periodic series of fields). It is noted that such a situation might, for instance, occur in the case where the device did not establish NFC communication until the third NFC exposure discussed above. It is further noted that, in embodiments in which the time for the device to perform a field exposure and corresponding cessation was one-third of a second, the time experienced by the device in the worst case might, for instance, be one second.

In various embodiments, a device seeking to establish NFC communication as discussed above might itself be a wireless node and/or other computer (e.g., of the sort discussed above).

It is noted that, in various embodiments, radio frequency fields might be other than those from one or more periodic series of fields. For example, the device might keep one or more radio frequency fields active throughout operations discussed herein. Accordingly, in various embodiments, various operations discussed herein (e.g., those discussed with respect to FIG. 3) might be performed with respect to such fields.

It is also noted that, in various embodiments, radio frequency fields discussed herein might be those suitable for NFC communications (e.g., 13.56 MHz fields with suitable modulation). Moreover, in various embodiments, various hardware, devices, and/or operations discussed herein might not be affected by and/or might not react to unsuitable fields.

External Device Contactless Smartcard Access Operations

Figure 4:
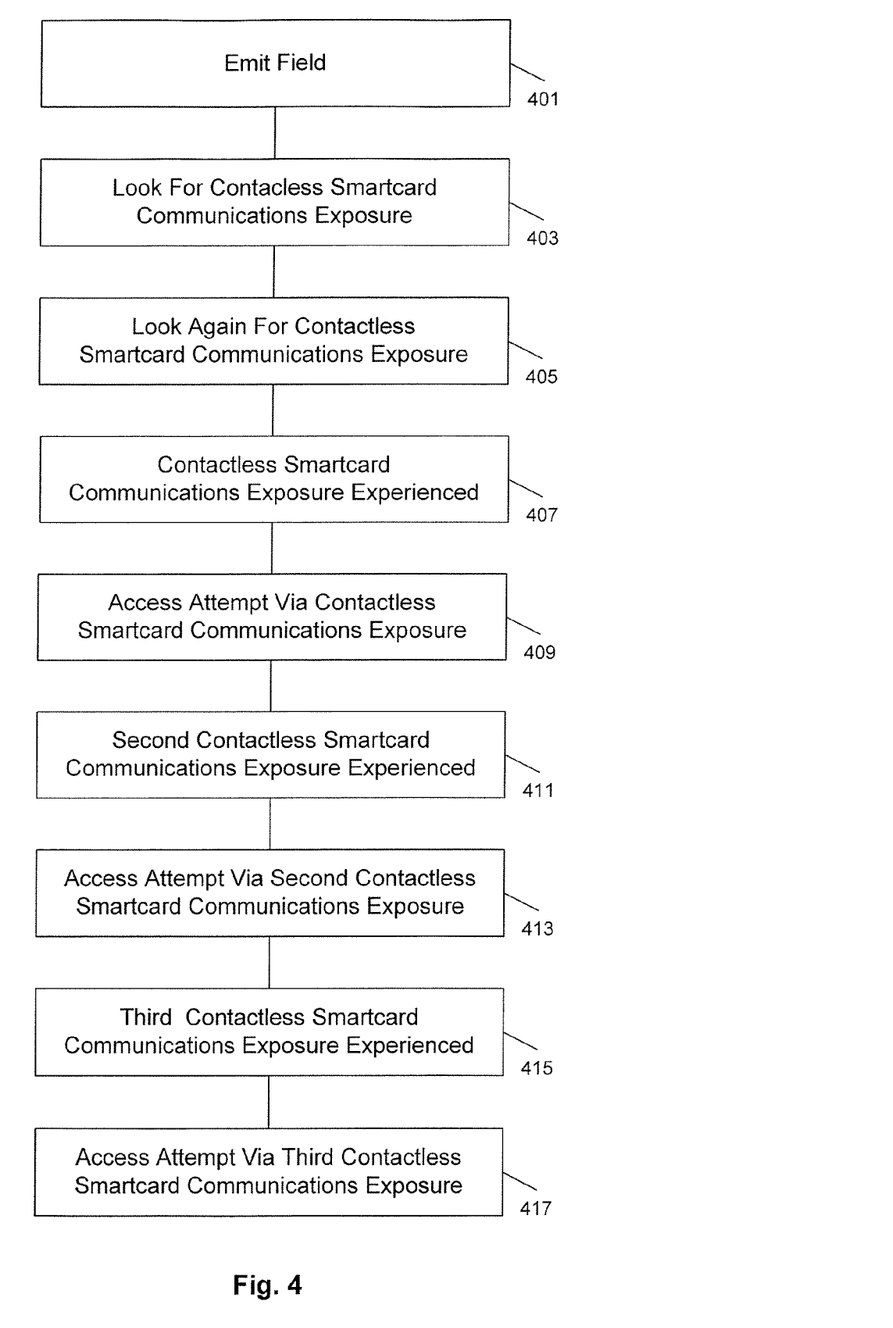
FIG. 4 shows exemplary steps involved in external device contactless smartcard access operations according to various embodiments of the present invention.

With respect to FIG. 4 it is noted that a device (e.g., a contactless smartcard reader and/or writer, and/or a Point of Sale (POS) device) seeking to access, in the manner that a contactless smartcard would be accessed, a wireless node and/or other computer of the sort discussed herein might, in various embodiments, emit a radio frequency field (e.g., as a member of a periodic series of fields) (step 401). Having emitted the field the device might, for instance, look for contactless smartcard communications exposure (step 403).

In various embodiments the wireless node and/or other computer might (e.g., as discussed above) detect the radio frequency field emitted by the device, exit an idle state, expose NFC communications, cease the exposure of NFC communications, and then expose contactless smartcard communications.

Accordingly, in various embodiments the device, after emitting the field, might at first not experience contactless smartcard communications exposure by the wireless node and/or other computer as NFC communications were being exposed. The device might then, for instance, look again for such exposure (e.g., while still emitting the radio frequency field) one or more times (step 405). By so looking again for such exposure, the device might, for instance, come to experience contactless smartcard communications exposure (e.g., via the wireless node and/or other computer exposing contactless smartcard communications subsequent to exposing NFC communications (step 407)). The device might then, for example, attempt, via the exposure, to access the wireless node and/or other computer in the manner that a contactless smartcard would be accessed (step 409).

The device might, in various embodiments, experience a second contactless smartcard communications exposure (step 411) (e.g., via the wireless node and/or other computer's performance of step 109) and be able to attempt, via the second exposure, to access the wireless node and/or other computer in the manner that a contactless smartcard would be accessed (step 413). This second opportunity might, for instance, arise subsequent to the device ceasing field emission and emitting a second field (e.g., as a member of the periodic series of fields of which the device's initial emission was also a member). The device might, for example, take advantage of this second opportunity in the case where the first attempt to access the wireless node and/or other computer was not successful.

After this second opportunity, the device might not experience another contactless smartcard communications exposure until it had performed radio frequency field emission (e.g., with corresponding field cessation) a certain number of times. Such field emissions might, for instance, be members of the periodic series of fields of which the device's initial emission was also a member.

The device might, for example, cease emission of the second field, emit a third field, cease emission of the third field, emit a fourth field, and then experience a third contactless smartcard communications exposure (step 415). Such contactless smartcard communications exposure might, for instance, occur during the wireless node and/or other computer performing step 105 subsequent to performing step 113, entering the idle state with field cessation, performing step 101, and performing step 103. The device might then, for example, attempt, via the third exposure, to access the wireless node and/or other computer in the manner that a contactless smartcard would be accessed (step 417).

As another example, the device might cease emission of the second field, emit a third field, and then experience a third contactless smartcard communications exposure in the case where cessation of the third field did not occur within a particular period of time (e.g., as discussed above). Such third contactless smartcard communications exposure might, for instance, occur during the wireless node and/or other computer performing step 105 subsequent to performing step 113 and jumping from step 113 to step 105 in the case where cessation of the third field did not occur within a particular period of time (e.g., as discussed above).

It is noted that, in various embodiments, a device seeking to access a wireless node and/or other computer in the manner that a contactless smartcard would be accessed might frequently emit fields (e.g., with corresponding field cessations) such that, for instance, the delay experienced by the device before achieving such access might be small (e.g., 100-200 milliseconds maximum). It is further noted that, in various embodiments, such a device might immediately retry communications and/or perform a field cessation followed by a field emission in the case where communications could not be established.

It is noted that, in various embodiments, radio frequency fields might be other than those from one or more periodic series of fields. For example, the device might keep one or more radio frequency fields active throughout operations discussed herein. Accordingly, in various embodiments, various operations discussed herein (e.g., those discussed with respect to FIG. 4) might be performed with respect to such fields.

It is also noted that, in various embodiments, radio frequency fields discussed herein might be those suitable for NFC communications (e.g., 13.56 MHz fields with suitable modulation). Moreover, in various embodiments, various hardware, devices, and/or operations discussed herein might not be affected by and/or might not react to unsuitable fields.

Hardware and Software

Various operations and/or the like described herein may, in various embodiments, be executed by and/or with the help of computers. Further, for example, devices described herein may be and/or may incorporate computers. The phrases "computer", "general purpose computer", and the like, as used herein, refer but are not limited to a smart card, a media device, a personal computer, an engineering workstation, a PC, a Macintosh, a PDA, a portable computer, a computerized watch, a wired or wireless terminal, telephone, communication device, node, and/or the like, a server, a network access point, a network multicast point, a network device, a set-top box, a personal video recorder (PVR), a game console, a portable game device, a portable audio device, a portable media device, a portable video device, a television, a digital camera, a digital camcorder, a Global Positioning System (GPS) receiver, a wireless personal sever, or the like, or any combination thereof, perhaps running an operating system such as OS X, Linux, Darwin, Windows CE, Windows XP, Windows Server 2003, Palm OS, Symbian OS, or the like, perhaps employing the Series 40 Platform, Series 60 Platform, Series 80 Platform, and/or Series 90 Platform, and perhaps having support for Java and/or .Net.

Figure 5:
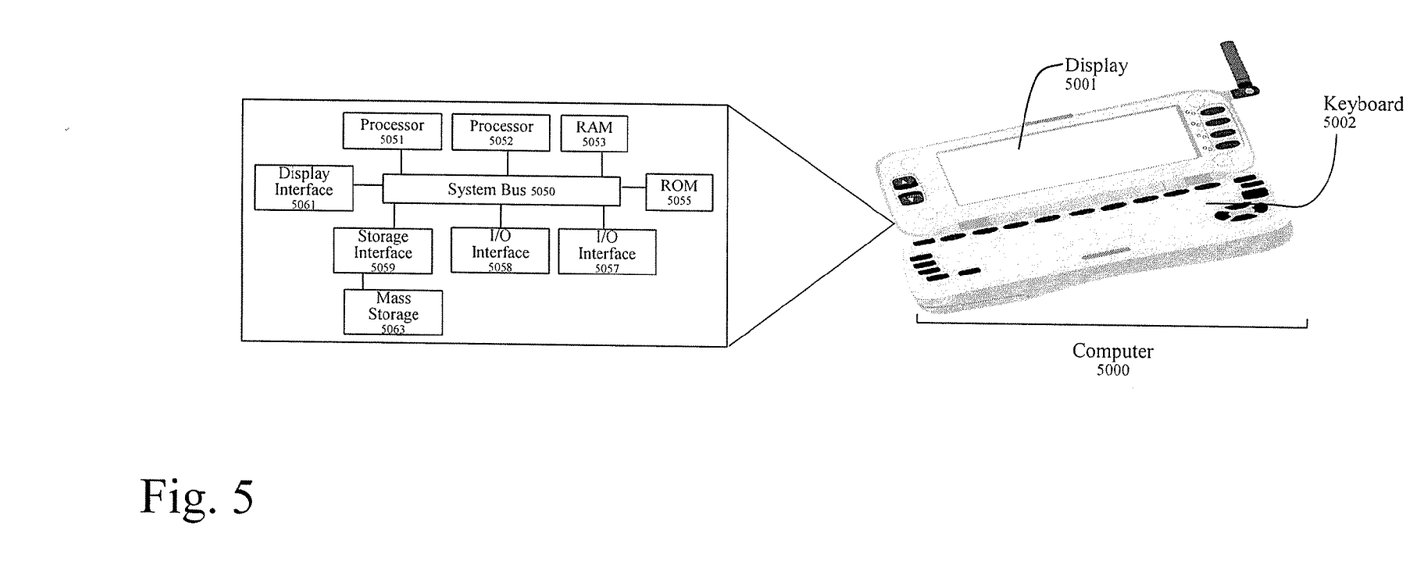
FIG. 5 shows an exemplary computer.

The phrases "general purpose computer", "computer", and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Shown in FIG. 5 is an exemplary computer employable in various embodiments of the present invention. Exemplary computer 5000 includes system bus 5050 which operatively connects two processors 5051 and 5052, random access memory 5053, read-only memory 5055, input output (I/O) interfaces 5057 and 5058, storage interface 5059, and display interface 5061. Storage interface 5059 in turn connects to mass storage 5063. Each of I/O interfaces 5057 and 5058 may, for example, be an Ethernet, IEEE 1394, IEEE 1394b, IEEE 802.11a, IEEE 802.11b, IEEE 802.11 g, IEEE 802.11i, IEEE 802.11e, IEEE 802.11n, IEEE 802.15a, IEEE 802.16a, IEEE 802.16d, IEEE 802.16e, IEEE 802.16x, IEEE 802.20, IEEE 802.15.3, ZigBee (e.g., IEEE 802.15.4), Bluetooth, Ultra Wide Band (UWB), Wireless Universal Serial Bus (WUSB), wireless Firewire, terrestrial digital video broadcast (DVB-T), satellite digital video broadcast (DVB-S), Advanced Television Systems Committee (ATSC), Integrated Services Digital Broadcasting (ISDB), Digital Multimedia Broadcast-Terrestrial (DMB-T), MediaFLO (Forward Link Only), Terrestrial Digital Multimedia Broadcasting (T-DMB), Digital Audio Broadcast (DAB), Digital Radio Mondiale (DRM), General Packet Radio Service (GPRS), Universal Mobile Telecommunications Service (UMTS), Global System for Mobile Communications (GSM), Code Division Multiple Access 2000 (CDMA2000), DVB-H (Digital Video Broadcasting: Handhelds), IrDA (Infrared Data Association), and/or other interface.

Mass storage 5063 may be a hard drive, optical drive, a memory chip, or the like. Processors 5051 and 5052 may each be a commonly known processor such as an IBM or Freescale PowerPC, an AMD Athlon, an AMD Opteron, an Intel ARM, an Intel XScale, a Transmeta Crusoe, a Transmeta Efficeon, an Intel Xenon, an Intel Itanium, an Intel Pentium, an Intel Core, or an IBM, Toshiba, or Sony Cell processor. Computer 5000 as shown in this example also includes a touch screen 5001 and a keyboard 5002. In various embodiments, a mouse, keypad, and/or interface might alternately or additionally be employed. Computer 5000 may additionally include or be attached to card readers, DVD drives, floppy disk drives, hard drives, memory cards, ROM, and/or the like whereby media containing program code (e.g., for performing various operations and/or the like described herein) may be inserted for the purpose of loading the code onto the computer.

In accordance with various embodiments of the present invention, a computer may run one or more software modules designed to perform one or more of the above-described operations. Such modules might, for example, be programmed using languages such as Java, Objective C, C, C#, C++, Perl, Python, and/or Comega according to methods known in the art. Corresponding program code might be placed on media such as, for example, DVD, CD-ROM, memory card, and/or floppy disk. It is noted that any described division of operations among particular software modules is for purposes of illustration, and that alternate divisions of operation may be employed. Accordingly, any operations discussed as being performed by one software module might instead be performed by a plurality of software modules. Similarly, any operations discussed as being performed by a plurality of modules might instead be performed by a single module. It is noted that operations disclosed as being performed by a particular computer might instead be performed by a plurality of computers. It is further noted that, in various embodiments, peer-to-peer and/or grid computing techniques may be employed. It is additionally noted that, in various embodiments, remote communication among software modules may occur. Such remote communication might, for example, involve Simple Object Access Protocol (SOAP), Java Messaging Service (JMS), Remote Method Invocation (RMI), Remote Procedure Call (RPC), sockets, and/or pipes.

Figure 6:
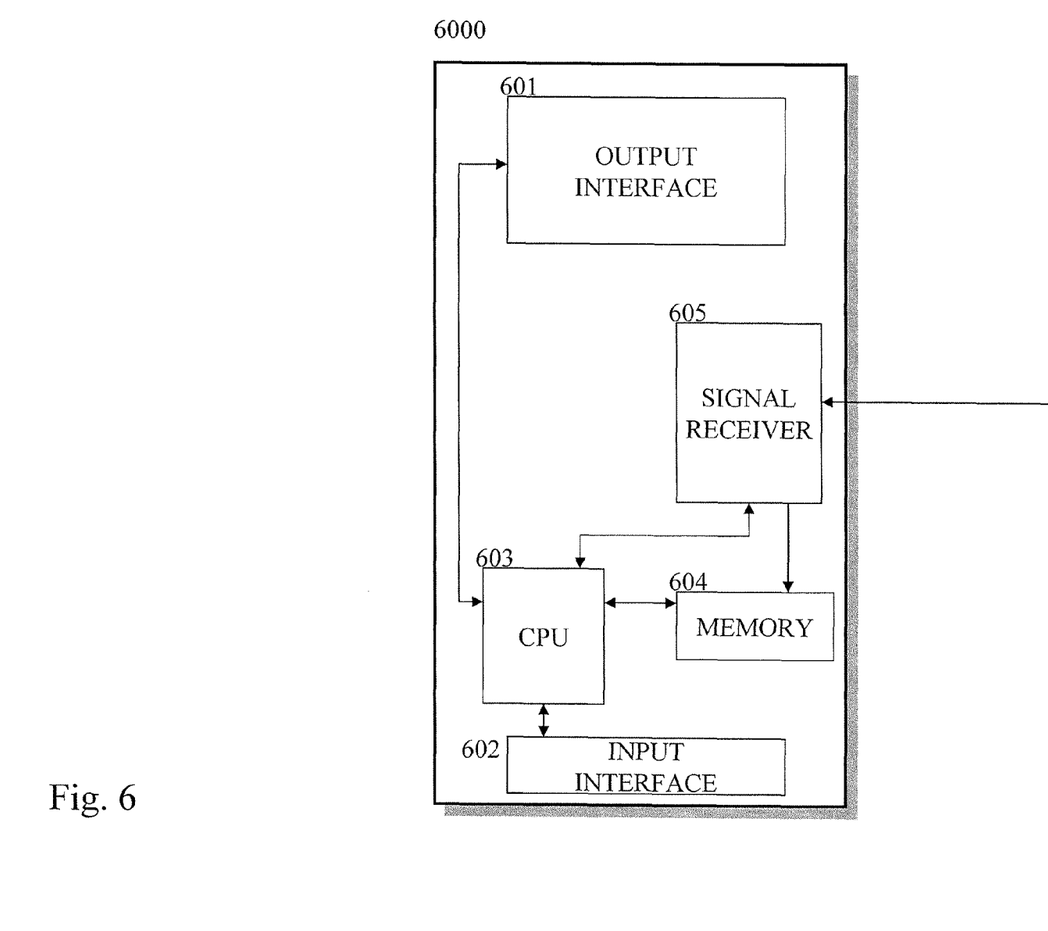
FIG. 6 shows a further exemplary computer.

Shown in FIG. 6 is a block diagram of a terminal, an exemplary computer employable in various embodiments of the present invention. In the following, corresponding reference signs are applied to corresponding parts. Exemplary terminal 6000 of FIG. 6 comprises a processing unit CPU 603, a signal receiver 605, and a user interface (601, 602). Signal receiver 605 may, for example, be a single-carrier or multi-carrier receiver. Signal receiver 605 and the user interface (601, 602) are coupled with the processing unit CPU 603. One or more direct memory access (DMA) channels may exist between multi-carrier signal terminal part 605 and memory 604. The user interface (601, 602) comprises a display and a keyboard to enable a user to use the terminal 6000. In addition, the user interface (601, 602) comprises a microphone and a speaker for receiving and producing audio signals. The user interface (601, 602) may also comprise voice recognition (not shown).

The processing unit CPU 603 comprises a microprocessor (not shown), memory 604 and possibly software. The software can be stored in the memory 604. The microprocessor controls, on the basis of the software, the operation of the terminal 6000, such as receiving of a data stream, tolerance of the impulse burst noise in data reception, displaying output in the user interface and the reading of inputs received from the user interface. The hardware contains circuitry for detecting signal, circuitry for demodulation, circuitry for detecting impulse, circuitry for blanking those samples of the symbol where significant amount of impulse noise is present, circuitry for calculating estimates, and circuitry for performing the corrections of the corrupted data.

Still referring to FIG. 6, alternatively, middleware or software implementation can be applied. The terminal 6000 can, for instance, be a hand-held device which a user can comfortably carry. The terminal 6000 can, for example, be a cellular mobile phone which comprises the multi-carrier signal terminal part 605 for receiving multicast transmission streams. Therefore, the terminal 6000 may possibly interact with the service providers.

It is noted that various operations and/or the like described herein may, in various embodiments, be implemented in hardware (e.g., via one or more integrated circuits). For instance, in various embodiments various operations and/or the like described herein may be performed by specialized hardware, and/or otherwise not by one or more general purpose processors. One or more chips and/or chipsets might, in various embodiments, be employed. In various embodiments, one or more Application-Specific Integrated Circuits (ASICs) may be employed.

Ramifications and Scope

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

In addition, the embodiments, features, methods, systems, and details of the invention that are described above in the application may be combined separately or in any combination to create or describe new embodiments of the invention.

What is claimed is:

1. A method, comprising:
   detecting at an apparatus an external radio frequency field;
   selecting at the apparatus a near field communications module;
   allowing at the apparatus near field communications by, during the allowance of the near field communications, permitting the near field communications module access to near field communications hardware of the apparatus and denying a smartcard module access to the near field communications hardware of the apparatus;
   ceasing at the apparatus the allowance of the near field communications;
   selecting at the apparatus the smart card module; and
   allowing at the apparatus contactless smartcard communications by, during the allowance of the contactless smartcard communications, permitting the smartcard module access to the near field communications hardware of the apparatus.

2. The method of claim 1, wherein near field communications allowance permits at least one of peer-to-peer operation and operation in a manner of a radio frequency identification tag.

3. The method of claim 1, wherein contactless smartcard communications allowance permits one or more transactions to be made.

4. The method of claim 1, wherein giving the smartcard module access to the near field communications hardware comprises disrupting some or all communications between at least one processor and the smartcard module.

5. The method of claim 1, wherein the near field communications hardware is employable in radio frequency identification reader functionality for sending interrogations.

6. The method of claim 1, wherein the near field communications are allowed for a predetermined period of time.

7. The method of claim 1, further comprising:
   ceasing the allowance of the contactless smartcard communications; and
   initiating near field communication.

8. The method of claim 1, wherein there is no reaction to one or more unsuitable radio frequency fields.

9. The method of claim 1, wherein one or more unsuitable radio frequency fields do not have any effect.

10. A method, comprising:
    detecting at an apparatus a first external radio frequency field from a periodic series of external radio frequency fields;
    selecting at the apparatus a near field communications module;
    allowing at the apparatus near field communications by, during the allowance of the near field communications, permitting the near field communications module access to near field communications hardware of the apparatus and denying a smartcard module access to the near field communications hardware of the apparatus;
    ceasing at the apparatus the allowance of the near field communications;
    selecting at the apparatus the smart card module;
    allowing at the apparatus contactless smartcard communications by, during the allowance of the contactless smartcard communications, permitting the smartcard module access to the near field communications hardware of the apparatus;
    detecting at the apparatus a second external radio frequency field from the periodic series of external radio frequency fields;
    allowing at the apparatus the contactless smartcard communications by, during said allowance of the contactless smartcard communications subsequent to the detection of the second radio frequency field, permitting the smartcard module access to the near field communications hardware of the apparatus;
    detecting at the apparatus a third external radio frequency field from the periodic series of external radio frequency fields;
    ceasing at the apparatus the allowance of the contactless smartcard communications;
    reselecting at the apparatus the near field communications module; and
    allowing at the apparatus the near field communications by, during said allowance of the near field communications subsequent to the detection of the third radio frequency field, permitting the near field communications module access to the near field communications hardware of the apparatus and denying the smartcard module access to the near field communications hardware of the apparatus.

11. The method of claim 10, wherein near field communications allowance permits at least one of peer-to-peer operation and operation in a manner of a radio frequency identification tag.

12. The method of claim 10, wherein contactless smartcard communications allowance permits one or more transactions to be made.

13. The method of claim 10, wherein there is no reaction to one or more unsuitable radio frequency fields.

14. The method of claim 10, wherein one or more unsuitable radio frequency fields do not have any effect.

15. An apparatus, comprising:
    at least one processor; and
    at least one memory including computer program code, the at least one memory and the computer program code configured to, with the at least one processor, cause the apparatus at least to perform:
    detect at the apparatus an external radio frequency field;
    select at the apparatus a near field communications module;
    allow at the apparatus near field communications by, during the allowance of the near field communications, permitting the near field communications module access to near field communications hardware of the apparatus and denying a smartcard module access to the near field communications hardware of the apparatus;
    cease at the apparatus the allowance of the near field communications;
    select at the apparatus the smart card module; and
    allow at the apparatus contactless smartcard communications by, during the allowance of the contactless smartcard communications, permitting the smartcard module access to the near field communications hardware of the apparatus.

16. The apparatus of claim 15, wherein near field communications allowance permits at least one of peer-to-peer operation and operation in a manner of a radio frequency identification tag.

17. The apparatus of claim 15, wherein contactless smartcard communications allowance permits one or more transactions to be made.

18. The apparatus of claim 15, wherein giving the smartcard module access to the near field communications hardware comprises disrupting some or all communications between the at least one processor and the smartcard module.

19. The apparatus of claim 15, wherein the near field communications hardware is employable in radio frequency identification reader functionality for sending interrogations.

20. The apparatus of claim 15, wherein the near field communications are allowed for a predetermined period of time.

21. The apparatus of claim 15, wherein the at least one memory and the computer program code are further configured to, with the at least one processor, cause the apparatus to:
cease the allowance of the contactless smartcard communications; and
initiate near field communication.

22. The apparatus of claim 15, further comprising:
at least one network interface disposed in communication with the at least one processor,
wherein the apparatus is a wireless node.

23. The apparatus of claim 15, wherein there is no reaction to one or more unsuitable radio frequency fields.

24. The apparatus of claim 15, wherein one or more unsuitable radio frequency fields do not have any effect.

25. An apparatus, comprising:
at least one processor; and
at least one memory including computer program code, the at least one memory and the computer program code configured to, with the at least one processor, cause the apparatus at least to perform:
detect at the apparatus a first external radio frequency field from a periodic series of external radio frequency fields;
select at the apparatus a near field communications module;
allow at the apparatus near field communications by, during the allowance of the near field communications, permitting the near field communications module access to near field communications hardware of the apparatus and denying a smartcard module access to the near field communications hardware of the apparatus;
cease at the apparatus the allowance of the near field communications;
select at the apparatus the smart card module;
allow at the apparatus contactless smartcard communications by, during the allowance of the contactless smartcard communications, permitting the smartcard module access to the near field communications hardware of the apparatus;
detect at the apparatus a second external radio frequency field from the periodic series of external radio frequency fields;
allow at the apparatus the contactless smartcard communications by, during said allowance of the contactless smartcard communications subsequent to the detection of the second radio frequency field, permitting the smartcard module access to the near field communications hardware of the apparatus;
detect at the apparatus a third external radio frequency field from the periodic series of external radio frequency fields;
cease at the apparatus the allowance of the contactless smartcard communications;
reselect at the apparatus the near field communications module; and
allow at the apparatus the near field communications by, during said allowance of the near field communications subsequent to the detection of the third radio frequency field, permitting the near field communications module access to the near field communications hardware of the apparatus and denying the smartcard module access to the near field communications hardware of the apparatus.

26. The apparatus of claim 25, wherein near field communications allowance permits at least one of peer-to-peer operation and operation in a manner of a radio frequency identification tag.

27. The apparatus of claim 25, wherein contactless smartcard communications allowance permits one or more transactions to be made.

28. The apparatus of claim 25, further comprising:
at least one network interface disposed in communication with the at least one processor,
wherein the apparatus is a wireless node.

29. The apparatus of claim 25, wherein there is no reaction to one or more unsuitable radio frequency fields.

30. The apparatus of claim 25, wherein one or more unsuitable radio frequency fields do not have any effect.

31. A computer program product comprising computer executable program code recorded on a computer readable storage medium, the computer executable program code comprising:
code for causing detection at an apparatus of an external radio frequency field;
code for causing selection at the apparatus of a near field communications module;
code for causing allowance at the apparatus of near field communications by, during the allowance of the near field communications, permitting the near field communications module access to near field communications hardware of the apparatus and denying a smartcard module access to the near field communications hardware of the apparatus;
code for causing cessation at the apparatus of the allowance of the near field communications;
code for causing selection at the apparatus of the smart card module; and
code for causing allowance at the apparatus of contactless smartcard communications by, during the allowance of the contactless smartcard communications, permitting the smartcard module access to the near field communications hardware of the apparatus.

32. A computer program product comprising computer executable program code recorded on a computer readable storage medium, the computer executable program code comprising:
code for causing detection at an apparatus of a first external radio frequency field from a periodic series of external radio frequency fields;
code for causing selection at the apparatus of a near field communications module;
code for causing allowance at the apparatus, of near field communications by, during the allowance of the near field communications, permitting the near field communications module access to near field communications hardware of the apparatus and denying a smartcard module access to the near field communications hardware of the apparatus;
code for causing cessation at the apparatus of the allowance of the near field communications,
code for causing selection at the apparatus of the smart card module;

code for causing allowance at the apparatus, of contactless smartcard communications by, during the allowance of the contactless smartcard communications, permitting the smartcard module access to the near field communications hardware of the apparatus;

code for causing detection at the apparatus of a second external radio frequency field from the periodic series of external radio frequency fields;

code for causing allowance at the apparatus of the contactless smartcard communications by, during said allowance of the contactless smartcard communications subsequent to the detection of the second radio frequency field, permitting the smartcard module access to the near field communications hardware of the apparatus;

code for causing detection at the apparatus of a third external radio frequency field from the periodic series of external radio frequency fields;

code for causing cessation at the apparatus of the allowance of the contactless smartcard communications;

code for causing reselection at the apparatus of the near field communications module; and code for causing allowance at the apparatus of the near field communications by, during said allowance of the near field communications subsequent to the detection of the third radio frequency field, permitting the near field communications module access to the near field communications hardware of the apparatus and denying the smartcard module access to the near field communications hardware of the apparatus.

* * * * *